Sept. 3, 1957 J. H. BRASHER 2,805,105
MULTI-PURPOSE TOOL CONNECTION
Filed Aug. 13, 1954 3 Sheets-Sheet 3
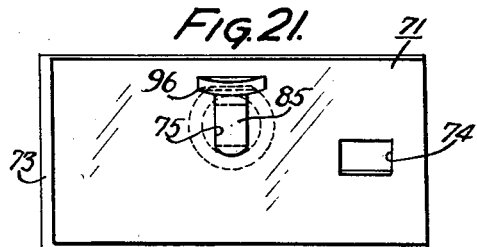
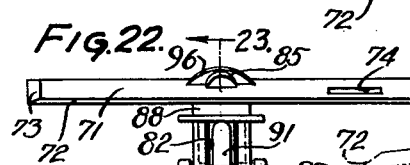
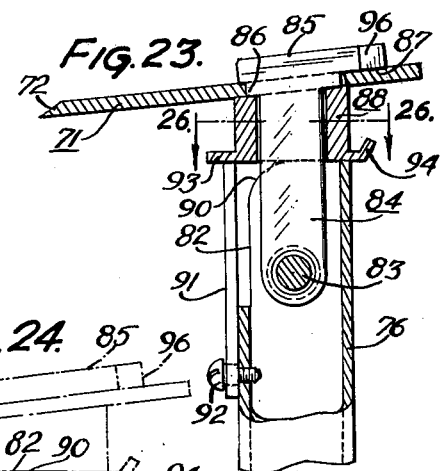
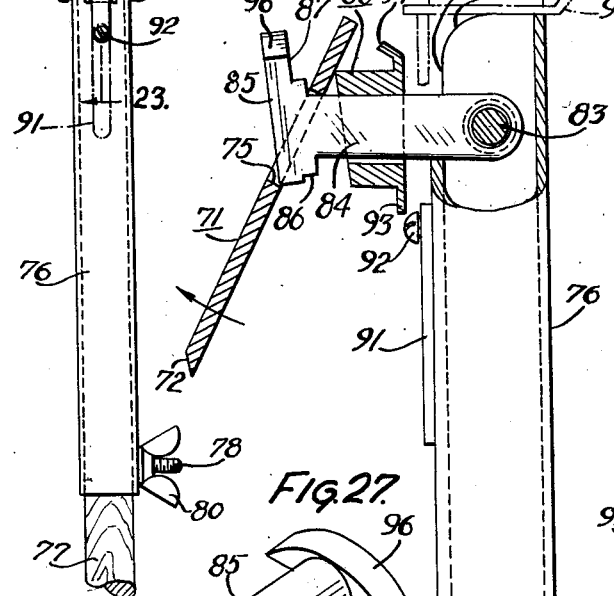
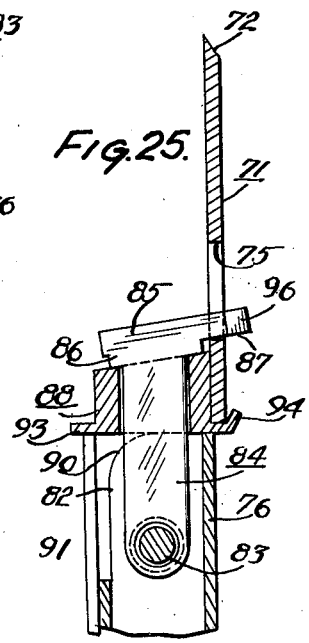
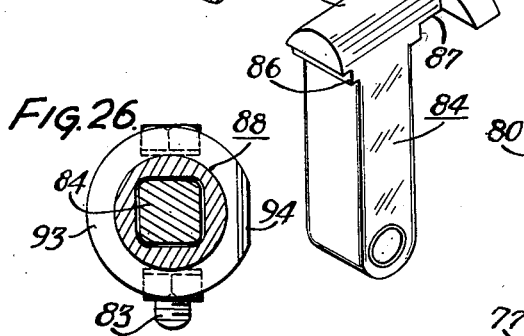
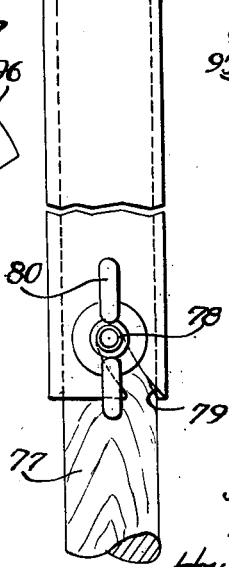
Inventor:
James H. Brasher
by his Attorneys
Howson & Howson

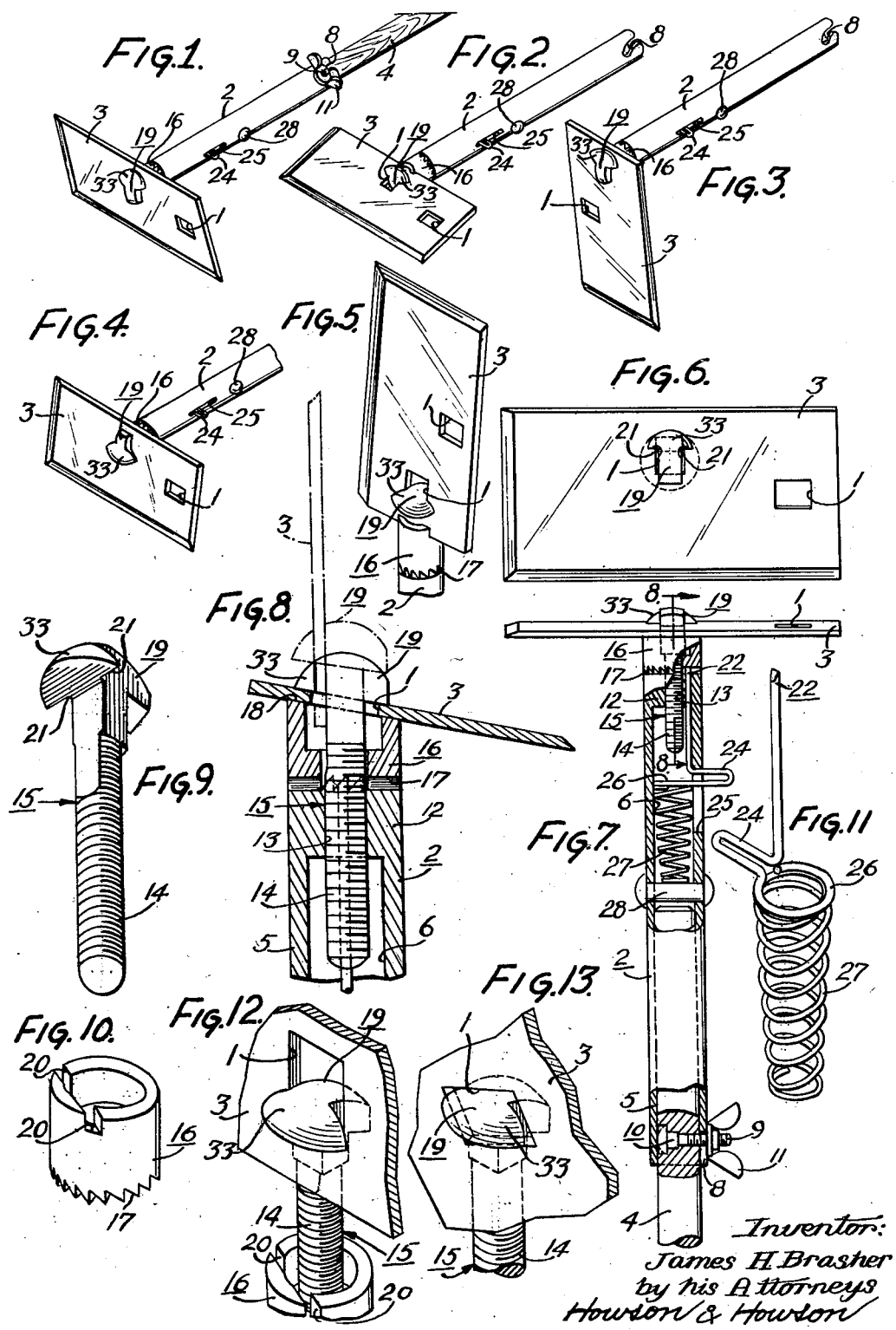

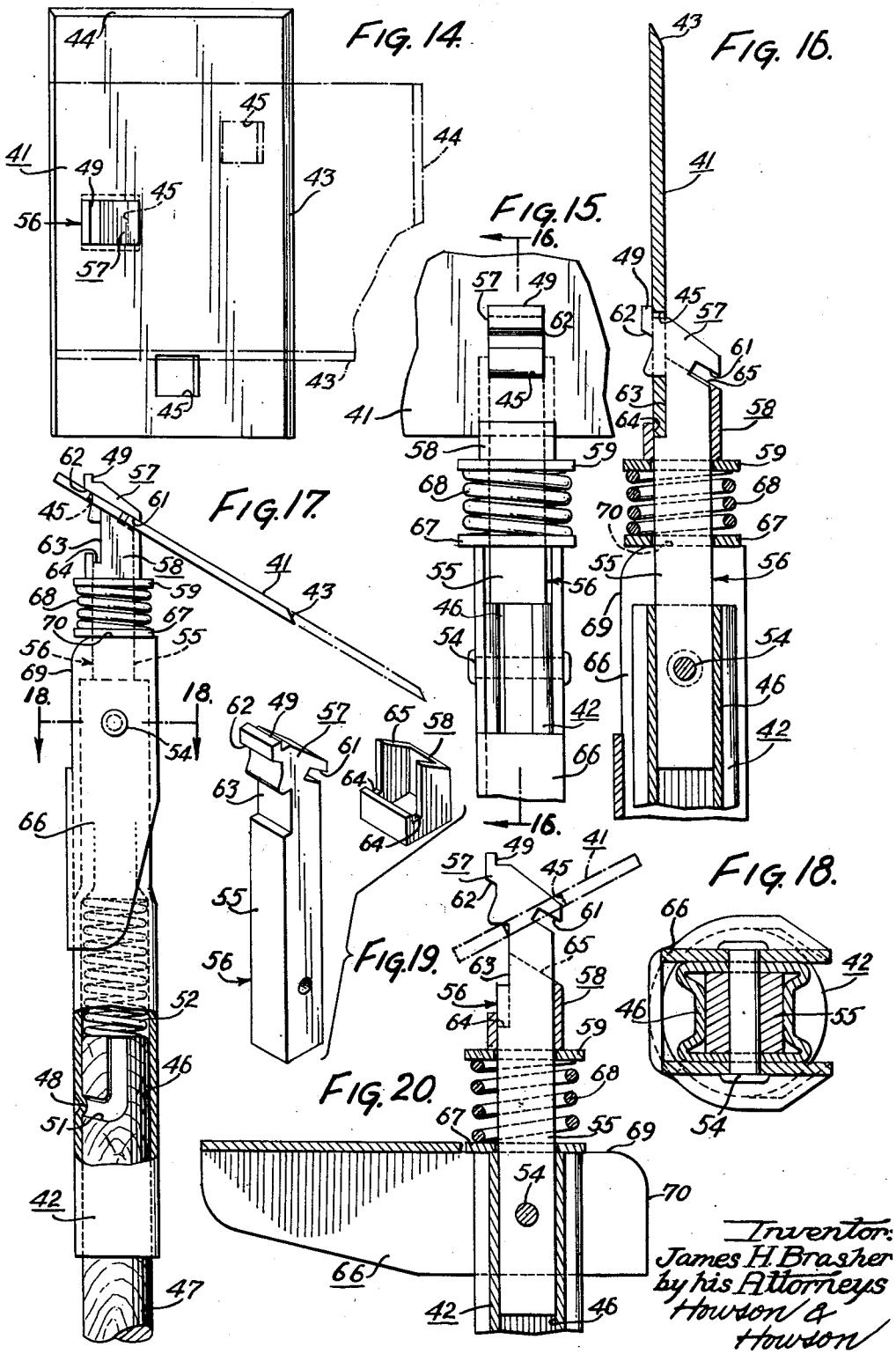

United States Patent Office 2,805,105
Patented Sept. 3, 1957

2,805,105

MULTI-PURPOSE TOOL CONNECTION

James H. Brasher, Conshohocken, Pa.

Application August 13, 1954, Serial No. 450,293

7 Claims. (Cl. 306—6)

The present invention relates to garden tools and more particularly to a multi-purpose garden tool having a removable blade which is adjustable into selected positions according to its intended use, and is a continuation-in-part of my application Serial No. 282,578, filed April 16, 1952 now abandoned.

A primary object of the present invention is to provide a tool of the stated class wherein the blade may be readily adjusted and secured in any one of several positions.

A further object is to provide a tool of the stated class wherein the blade may be securely locked in its adjusted position.

Another object of the invention is to provide a tool having a rugged blade which may be manufactured economically by simple forming operations.

Still another object is to provide a tool having a blade which is readily removable for replacement or repair.

Yet another object is to provide a tool wherein the blade has limited angular adjustment relative to the handle.

A still further object is to provide a tool wherein the adjusting mechanism is proof against becoming clogged with soil or earth.

In the drawings:

Figs. 1 to 5 inclusive are perspective views of a tool made in accordance with the present invention in selected operating positions;

Fig. 6 is a plan view of the tool head in the position illustrated in Fig. 1;

Fig. 7 is an elevational view of the tool head with fragments broken away to more clearly illustrate the adjusting mechanism;

Fig. 8 is an enlarged sectional view on the line 8—8 of Fig. 7;

Figs. 9, 10, and 11 are perspective views of elements of the tool;

Figs. 12 and 13 are fragmentary perspective views of the tool illustrating the method of adjustment of the tool blade;

Fig. 14 is a plan view of a modified form of the invention similar to the view of Fig. 6;

Fig. 15 is a fragmentary elevational view of the embodiment illustrated in Fig. 14;

Fig. 16 is a sectional view taken on the line 16—16 of Fig. 15;

Fig. 17 is an elevational view similar to Fig. 16 showing the blade in a different position;

Fig. 18 is a sectional view taken on the line 18—18 of Fig. 17;

Fig. 19 is an exploded perspective view of certain operating elements;

Fig. 20 is a fragmentary sectional view illustrating the operation of the tool;

Fig. 21 is a plan view similar to Fig. 6 of a further embodiment of the invention;

Fig. 22 is an elevational view of the embodiment illustrated in Fig. 21;

Fig. 23 is a sectional view on the line 23—23 of Fig. 22;

Fig. 24 is an enlarged elevational view partially in section illustrating the mode of adjustment of the blade relative to the tool head;

Fig. 25 is a sectional view similar to Fig. 23 illustrating the blade in an adjusted position;

Fig. 26 is a sectional view on the line 26—26 of Fig. 23; and,

Fig. 27 is a perspective view of an element of the tool.

Referring to the drawings, and particularly to Figs. 1 to 13 inclusive, the tool therein illustrated comprises a shaft portion 2 and a blade 3. The blade is generally rectangular in shape with two adjoining edges being suitably sharpened, and the opposite edges being provided with generally rectangular apertures 1, 1 each spaced from said opposite edges and disposed approximately centrally thereof.

The blade is releasably secured to the shaft, as more fully set forth hereinafter, so as to be adjustable into several predetermined positions, for example as illustrated in Figs. 1 to 5 respectively. In Fig. 1 the blade is positioned for use as a hoe wherein the blade is positioned at an angle sloping slightly toward the shaft, as clearly illustrated in full lines in Fig. 8. Preferably this angle is approximately seventy-five degrees. In Fig. 2, the blade is disposed transversely to and in parallel relation with the shaft. In this position, the blade is adapted for use as a hatchet for cutting small shrubs, or may be used for edging flower beds and the like. In the position illustrated in Fig. 3, the tool is adapted for use as a narrow hoe. As in the position of Fig. 1, the blade is at an angle approximating seventy-five degrees. Fig. 4 illustrates the tool wherein the blade diverges away from the shaft, at an angle, for example, of 105 degrees. In this position, the tool is useful for scraping boards or other rough lumber, or may be used as a weed cutter or the like. A further position is illustrated in Fig. 5 wherein the blade is disposed longitudinal with and parallel to the shaft, to provide a tool having characteristics similar to a machete or bolo knife, for cutting underbrush and small tree limbs.

It is apparent that the tool has widely diversified uses, and I have not attempted to enumerate all of them, nor have I illustrated all the positions the blade may assume. I have confined the above discussion primarily to garden uses, and it is to be understood that with little or no modification, the tool may be used effectively in the building trades, in carpentry, or even on the battlefront where its knock-down characteristics will prove especially beneficial.

It is frequently desirable to have a choice of handle lengths for a tool, and to this end, I provide a handle 4 which is releasably secured to the shaft 2. To provide a sturdy connection between these members, the shaft comprises a cylindrical tubular section 5 having a cylindrical bore 6 open at one end for the reception of the handle 4. The handle is inserted telescopically into the bore and is rigidly held therein by suitable fastening means. In the present instance, the fastening means comprises a bayonet slot 8 in the wall of the section 5 which slot snugly receives the threaded shank 9 of a carriage bolt 10 fixed in the shaft as indicated in Fig. 7. A wing nut 11 is provided on the shank 9 for securely clamping the handle 4 to the shaft 2 of the tool. With reference to Figs. 2 and 3, it is seen that the slot 8 is disposed angularly in the shaft wall whereby the handle may be forced into the tubular shaft by simple insertion of the shank 9 into the slot 8 and subsequent counter-clockwise rotation of the handle about its axis. When so positioned, the wing nut 11 may be tightened to lock the handle in proper position. The attachment of the handle is simple, whereby it is possible to change the handle or remove it entirely quickly and easily.

In accordance with the invention, changing the blade or adjusting its position is likewise simple. To this end, the tubular section 5 is terminated at its outer extremity with a closed end portion 12 which is provided with a central tapped aperture 13. The aperture 13 is adapted to receive the threaded shank 14 of an elongated member 15 which projects through one of the apertures 1 in the blade and terminates an enlarged head portion 19 for retaining the blade in position on the shaft. Slidably engaged on the shank of the member 15 for longitudinal movement thereon is a collar 16 whose shaft-confronting surface is toothed as indicated at 17 for a purpose more fully described hereinafter.

The upper face of the collar 16 is machined at an angle as indicated at 18 to provide an angular seat for the blade when adjusted to the position of Fig. 1, 3, or 4. This seat 18 is disposed at an angle approximating 75 degrees to the axis of the shaft. To provide the desired angular position of the blade, the under surface of the head 19 is likewise machined at an angle approximating 75 degrees to the axis of the bolt so that when the head is tightened against the blade, the blade is securely seated at the desired angle as shown in Fig. 8.

To provide for the adjustment of the blade to the positions illustrated in full lines in Figs. 2 and 5 and in broken lines in Fig. 8, the collar 16 is provided on its outer face with a pair of aligned notches or recesses 20, 20 which are dimensioned to snugly receive the side edge of the blade. The head 19 is cut away as indicated at 21 to permit the blade to be positioned parallel to the axis of the tool, the engaged projection 33 preventing outward displacement thereof. Thus, to effect adjustment into the positions illustrated in Figs. 2 and 5, the member 15 is adjusted outwardly from the shaft 2 to an extent permitting the blade 3 to be rocked into the extended position against the enlarged portion 33, as illustrated in broken lines in Fig. 8. The innermost edge of the blade is then engaged in the notches 20, 20 and the shaft may be tightened on the member 15 to securely clamp the blade between the head 19 and the notches 20, 20 of the collar. A secure seat for the blade is provided since the collar will be held stationary relative to the member 15 during the tightening by engagement of the blade with head portion 33 and the notches 20.

To securely lock the blade in adjusted position, a spring-loaded ratchet pawl 22 is provided which will register with the toothed under-surface 17 of the collar so as to permit only unidirectional rotation of the collar relative to the shaft. It is to be noted that in the positions of Figs. 1, 3, and 4, the collar 16 and the member 15 are relatively immobilized because of the confronting angular surfaces, whereas in the positions of Figs. 2 and 5, as pointed out above, they are immobilized by the respective engagement of the blade therewith. The pawl member 22, in the preferred form, projects through the closure 12 from the interior of the tubular section 5 as clearly illustrated in Fig. 7. The inner extremity of the pawl is provided with an out-turned handle portion 24 which projects radially from the shaft through a longitudinal slot 25 in the casing thereof. The free end of the handle portion 24 is turned back and terminates interiorly of the casing in a generally circular guide piece 26 which is adapted to slidably engage the interior bore 6 of the shaft for longitudinal movement therein. The ratchet 22 is resiliently held in engagement with the toothed surface 17 by means of a compression spring 27 disposed in the bore 6 to seat against the under surface of the guide piece 26 at one end, and against a stop 28 in the shaft 2 at the other. In the present embodiment, the stop 28 consists of a rivet passing through the bore of the shaft, but it is to be understood that any suitable stop member may be utilized without departure from the invention.

I have provided a novel tool comprising a blade 3 and a shaft 2 wherein the blade may be adjusted to positions either transverse to the axis of the shaft or longitudinal therewith. To provide for removal of the blade from the shaft, the aperture 1 is rectangular in shape, the shorter side being the side parallel the proximate edge of the blade. To remove the blade from the shaft, member 15 is loosened and the blade turned to permit the enlarged portion 33 of the bolt to pass through the aperture, as clearly illustrated in Fig. 13. It is to be noted that the short dimension of each aperture is slightly greater than the diameter of the member 15 to permit rotation of the blade through 180 degrees to allow adjustment of the blade from the position of Fig. 1 to the position of Fig. 3 without removal of the blade from the shaft.

Since the blade is readily removable, it is possible to fabricate the blade of a high grade steel so that it may efficiently perform the various functions set forth above. Where it is desired to use the tool in a location where it is likely to be damaged by disruptive contact with stones or other obstacles, a blade of lesser quality may be readily inserted into the assembly. It is understood therefore that the invention provides a tool which may be used in a variety of situations and which may be produced economically and efficiently.

A second embodiment is illustrated in Figs. 14 to 20 inclusive. In this embodiment, the tool comprises a blade 41 and a shaft 42. The blade in the present instance has two edges 43 and 44 respectively, sharpened to a fine cutting edge. Disposed centrally along each of the opposite unsharpened edges and spaced therefrom is a rectangular aperture 45 similar to the apertures 1, 1 of the previously described embodiment.

The shaft portion of the tool, as shown in Fig. 17, comprises a tubular section 46 which is adapted to telescopically receive a handle 47. The handle 47 is adapted to be releasably secured to the shaft. To this end, the handle 47 is provided with a bayonet recess 51 which engages a detent 48 in the bore of the tubular section. The recess terminates in an angularly disposed portion to provide for firm seating of the detent 48 in the slot by simple clockwise rotation of the handle when the detent is engaged in the recess 51. A spring 52 is provided to securely lock the handle in position by biasing the latter outwardly and retarding its angular displacement.

The blade of the tool may be adjusted in a manner similar to the first-described embodiment. To this end, the tubular portion 46 of the shaft 42 terminates in a rectangular portion which engages the shank 55 of an elongated blade-securing member 56. The blade-securing member comprises the shank 55 and an enlarged head portion 57 and is secured to the portion 53 as indicated at 54. The head portion 57 of the member 56 is undercut as indicated at 61 and 62 to seat snugly within the aperture 45 of the blade 41 and the shank 55 is cut out immediately below the head as indicated at 63 to permit the blade to be disengaged from the headed member. Removal of the blade is effected by pivoting the blade about the cut-out 63, the aperture 45 being sufficiently long to permit the head portion 57 to pass through, as indicated by the broken lines in Fig. 20.

Slidably engaged on the shank 55 is a collar member 58 which is adapted to seat against a washer 59 slidable on the shank 55. At the opposite end of the collar there is provided a pair of opposed aligned slots 64, 64 which are dimensioned to receive the member 41 as is apparent in Fig. 16. The upper surface 65 of the collar 58 is machined at an angle to the axis of the collar, in the present instance, 60 degrees, to provide for angular positioning of the blade relative to the shaft as in the previous embodiment.

The collar 58 is positioned on the shank 55 by a cam lever 66, a washer 67, a spring 68, and the washer 59. As shown in Fig. 20, the cam lever is pivoted to the shaft 42 as indicated at 54. The lever is provided with cam surfaces 69 and 70 which are disposed at an angle to one another to provide a projection therebetween. When the cam lever 66 is in a position shown in Figure 20, the collar 58 is displaced from the head portion 57, and when the cam lever is in a position shown in Fig. 17, the collar is biased against the blade 41 by the spring 68.

To secure the blade in proper position relative to the shaft, the cam lever 66 is pivoted to the position shown in Fig. 20 and the blade is seated against the undercut portions 61 and 62 of the head member. The collar 58 is brought into engagement with the under surface of the blade as illustrated in Fig. 17 by actuation of the lever 66 causing the spring 68 to be compressed between the washers 59 and 67. Because of the angular relation between the cam surfaces 69 and 70, the spring effects an over-center locking of the lever in its position paralleling the shaft 42.

To adjust the blade 41 into the position paralleling the axis of the shaft, the lever 66 is displaced away from the shaft 42 to afford downward displacement of the collar from the under surface of the blade. The blade 41 is then rocked into the recess 63 and upwardly until the blade assumes the position illustrated in Fig. 17. The collar is then shifted outwardly on the shank 55, the blade 57 entering the slots 64, 64 and the lever 66 is displaced against the shaft 42 to securely lock the blade between the slots 64, 64 and the cut-out 63 of the member 56. The lip 49 on the head portion 57 engages the blade 41 and insures against inadvertent displacement of the latter.

It will be appreciated, therefore, that the present embodiment is freely adjustable into the various blade positions illustrated in Figs. 1 to 5 of the previous embodiment. The overcenter engagement of the lever 66 obviates the need for a locking device such as illustrated in the previous embodiment to immobilize the collar relative to the shaft. The head portion 57 is rigidly secured to the shaft 42 so as to effect a direct transmission of force from the handle to the blade.

A third embodiment is illustrated in Figs. 21 to 27 wherein a camming action is utilized to clamp the blade of a tool between the head and the collar. In this embodiment, a blade 71 having two adjacent edges 72 and 73 sharpened as indicated in Fig. 21, is provided adjacent the unsharpened edges with a pair of rectangular openings 74 and 75 respectively. As in the first embodiment, the short side of the opening is disposed parallel to the adjacent side edge of the blade.

The blade is adapted to be secured to a shaft 76 comprising a tubular member adapted to telescopically receive a handle 77 which is secured to the shaft 76 in the aforedescribed manner by a bolt 78 registering with a bayonet slot 79 and adapted to receive a wing nut 80.

The outer end of the tubular shaft 76 is cut away along one side to provide a recess 82 in the side face thereof. Pivotally secured to the shaft in said recess at 83 is an elongated blade-securing member 84. The member 84 normally projects longitudinally from the shaft 76 into engagement with one of the apertures 74 and 75 and is provided at its outer extremity with an enlarged head portion 85. The under surface of the head portion 85, which is provided with a boss 86 dimensioned to seat nicely in the recess 74 or 75 as illustrated in Fig. 23, is disposed angularly to the longitudinal axis of the member 84 at approximately 75 degrees to afford angular seating of the blade 71. The blade is adapted to be firmly seated between the under surface 87 and a collar 88 which is provided at its outer extremity with an angular seating surface registering with and conforming to said angular under surface 87 (see Fig. 23). The collar 88 is adapted to slidably engage the shank portion of the member 84 for longitudinal movement thereon. If desired, the shank portion and the bore of the collar may be of rectangular cross section as shown in Fig. 26 to preclude inadvertent relative rotation therebetween.

In the present instance, the outer end of the tubular section 76 is formed with a cam surface 90 which will firmly seat the collar 88 against the blade 71 when the member 84 is rocked about its pivot 83 from the position illustrated in Fig. 24 to the position illustrated in Fig. 23. To secure the collar in locked position a lever 91 is provided which is pivotally secured to the shaft 76 as indicated at 92. Thus, when the collar is seated against the blade, the lever 91 may be pivoted into engagement with the projecting lip 93 on the under surface of the collar 88.

To secure the blade parallel to the shaft 76 the collar 88 is provided at its lower extremity with an upturned lip 94 which defines a recess adapted to receive the edge portion of the blade 71 which lies adjacent the opening 74 or 75. To adjust the blade from the position shown in Fig. 23 to the position shown in Fig. 25, the lever 91 is released from engagement with the lip 93 and the member 84 is pivoted downwardly to the position illustrated in Fig. 24. The collar is then displaced inwardly from the head 85 and the blade 71 disengaged from the boss 86 and swung upwardly as indicated by the arrow in Fig. 24 into engagement with the lip 94. To preclude outward displacement of the blade 71, the head portion 85 is provided with an enlarged projection 96 which effectively locks the blade 71 in the position illustrated in Fig. 25 when the member 84 is rocked into position.

While the invention has been described with reference to the illustrated embodiments, modifications in the structural details may be made without departure from the invention as defined in the appended claims.

I claim:

1. In a tool comprising a blade provided with an opening spaced inwardly adjacent one edge thereof, said opening having a given length normal to said one edge, and a shaft constituting a handle for the tool, means to secure said blade to the shaft comprising an elongated member having a shank normally projecting axially from said shaft and having a cross sectional area less than the area of said opening, said shank terminating in an enlarged head portion having a substantially flat under surface disposed at an acute angle to said shank, said surface being greater in length than the said given length of the opening to thereby provide on said under surface a seat for the outer surface of the blade adjacent the opening when the blade is positioned transversely of the shank, said head having a portion extending laterally beyond said shank at one side thereof so that when the blade is positioned longitudinally of said shank at said one side thereof, said lateral extension of the head forms on its underside a seat for the edge of said opening which is proximate to said one edge of the blade, a collar surrounding said shank and freely slidable longitudinally thereon having at the end adjacent said head portion of the elongated member a substantially flat surface disposed at an angle to said shank corresponding to said acute angle, said surface adapted to engage and seat the blade transversely of the shaft, said collar having a recess at said one side of the shank forming a seat to engage the said one edge of the blade when the latter is positioned longitudinally of the shaft, and means to urge said collar and said head towards one another so as to clamp the blade in position between the respective seating surfaces of said head and said collar.

2. A tool according to claim 1 wherein said shank is threaded and movable longitudinally of said shaft and said collar seats against the shaft at the end opposite to said substantially flat surface, and wherein said means to urge said collar and said head towards one another comprises threads on said shaft engageable with said threaded shank.

3. A tool according to claim 1 wherein said enlarged head portion is undercut to form a boss on its under surface, dimensioned and arranged to conform in outline to and seat within said opening.

4. A tool according to claim 1 wherein said elongated shank is connected to the outer end of said shaft for pivotal movement between alternative transverse and longitudinal positions, and wherein the outer terminal end of said shaft is provided with a cam surface on which the said collar is adapted to travel during said pivotal movement, said cam surface being dimensioned to urge said collar outwardly when said elongated member is disposed longitudinally of said shaft.

5. A tool according to claim 4 including means on said shaft adapted to engage the under surface of said collar to preclude pivotal displacement of said elongated member.

6. In a tool comprising a blade provided with an opening spaced inwardly adjacent one edge thereof, said opening having a given length normal to said one edge, and a shaft constituting a handle for the tool, means to secure said blade to the shaft comprising an elongated member rigidly mounted on said shaft and having a square shank normally projecting axially from said shaft and dimensioned to pass through said opening, said shank terminating in an enlarged head portion greater in length than the said given length of the opening to thereby provide on its under surface a seat for the surface of the blade adjacent the opening when the blade is positioned transversely of the shank, said head having a laterally projecting portion forming on its under surface a seat for the edge of said opening proximate to said one edge of the blade when the latter is positioned longitudinally of said shank at one side thereof, a collar having a rectangular bore surrounding said shank and freely slidable longitudinally thereon having at one end a substantially flat surface to seat the blade transversely of the shank and a recess to seat the said one edge of the blade when the latter is positioned longitudinally of the shank, and means to urge said collar toward said head so as to clamp the blade in position between the respective seating surfaces of said head and said collar, comprising a cam member movable on said shank operable in one position to position said collar against the blade and in the other position to afford displacement of said collar from said blade.

7. A tool according to claim 6 wherein said cam member is pivoted about an axis on said shank and comprises two angularly disposed contiguous surfaces and an intermediate projecting surface spaced from said axis a distance greater than the spacing of said surfaces from said axis, and including a spring compressed between said cam member and said collar to provide an over-center lock behind said projecting cam surface when the cam is in said one position.

References Cited in the file of this patent

UNITED STATES PATENTS

| | | |
|---|---|---|
| 344,590 | Middleton | June 29, 1886 |
| 717,353 | Cox | Dec. 30, 1902 |
| 2,194,716 | Neuhausen | Mar. 26, 1940 |